United States Patent [19]
Srinivasan et al.

[11] Patent Number: 5,947,076
[45] Date of Patent: Sep. 7, 1999

[54] FUEL COMBUSTION ASSEMBLY FOR AN INTERNAL COMBUSTION ENGINE HAVING AN ENCAPSULATED SPARK PLUG FOR IGNITING LEAN GASEOUS FUEL WITHIN A PRECOMBUSTION CHAMBER

[75] Inventors: Anand Srinivasan; Martin L. Willi, both of Lafayette, Ind.; Joel D. Hiltner, Peoria, Ill.; Min Wu, Lafayette, Ind.

[73] Assignee: Caterpillar Inc., Peoria, Ill.

[21] Appl. No.: 09/062,052

[22] Filed: Apr. 17, 1998

[51] Int. Cl.$^6$ .............................. F02B 19/00; F02B 19/18
[52] U.S. Cl. .......................... 123/267; 123/256; 123/260; 123/266
[58] Field of Search ..................... 123/267, 253, 123/256, 260, 266, 143 R; 313/143

[56] References Cited

U.S. PATENT DOCUMENTS

| | | | |
|---|---|---|---|
| 4,452,189 | 6/1984 | Latsch et al. | 123/143 R |
| 4,646,695 | 3/1987 | Blackburn | 123/256 |
| 4,696,269 | 9/1987 | Blackburn | 123/256 |
| 4,892,070 | 1/1990 | Kuhnert | 123/274 |
| 4,987,868 | 1/1991 | Richardson | 123/260 |
| 5,024,193 | 6/1991 | Graze, Jr. | 123/259 |
| 5,105,780 | 4/1992 | Richardson | 123/263 |
| 5,222,393 | 6/1993 | Crane | 123/256 |
| 5,554,908 | 9/1996 | Kuhnert et al. | 313/140 |

FOREIGN PATENT DOCUMENTS

| | | | |
|---|---|---|---|
| 3300945 A1 | 7/1984 | Germany | 123/256 |
| 52-52013 | 4/1977 | Japan | 123/256 |

*Primary Examiner*—Willis R. Wolfe
*Assistant Examiner*—Hieu T. Vo
*Attorney, Agent, or Firm*—Maginot, Addison & Moore

[57] ABSTRACT

An internal combustion engine includes a precombustion member which has a number of first ignition orifices defined therein. The precombustion member further has a precombustion chamber defined therein. The precombustion member is positioned relative to the head of the engine such that the precombustion chamber is in fluid communication with the engine's main combustion chamber via the first ignition orifices. The internal combustion engine further has a spark plug for igniting a gaseous fuel. The spark plug includes an encapsulating member which has a number of second ignition orifices defined therein. The encapsulating member defines a plug combustion chamber. The spark plug further includes a center electrode and a ground electrode which are both positioned within the plug combustion chamber. The encapsulating member is positioned relative to the precombustion member such that the plug combustion chamber is in fluid communication with the precombustion chamber via the second ignition orifices. The encapsulating member shelters the spark generated by the spark plug from turbulence within the precombustion chamber and the main combustion chamber. Such a configuration facilitates use of leaner gaseous fuel mixtures relative to fuel combustion assemblies which have heretofore been designed.

20 Claims, 4 Drawing Sheets

FUEL COMBUSTION ASSEMBLY FOR AN INTERNAL COMBUSTION ENGINE HAVING AN ENCAPSULATED SPARK PLUG FOR IGNITING LEAN GASEOUS FUEL WITHIN A PRECOMBUSTION CHAMBER

TECHNICAL FIELD OF THE INVENTION

The present invention relates generally to an internal combustion engine, and more particularly to a fuel combustion assembly for an internal combustion engine having an encapsulated spark plug for igniting lean gaseous fuel within a precombustion chamber.

BACKGROUND OF THE INVENTION

During operation of an internal combustion engine, it is desirable to control the formation and emission of certain gases, such as the oxides of nitrogen ($NO_x$). In particular, $NO_x$ is produced when nitrogen and oxygen are combined at very high peak temperatures within the main combustion chamber of the engine. Such high peak temperatures facilitate the oxidation or "burning" of nitrogen with oxygen, both of which are part of the air present in the main combustion chamber. The amount of $NO_x$ which is formed increases as the peak combustion temperatures within the main combustion chamber increases.

Hence, a number of "lean-burn" internal combustion engines have heretofore been designed in order to reduce the amount of $NO_x$ produced during operation thereof. A lean-burn internal combustion engine utilizes a lean gaseous fuel mixture which has a relatively large air-to-fuel ratio (i.e. having significantly more air) when compared to a gaseous fuel mixture having a stoichiometric air-to-fuel ratio. Use of such lean gaseous mixtures reduces the peak combustion temperatures thereby reducing the amount of $NO_x$ which is produced during operation of the internal combustion engine.

Because of the lean air-to-fuel ratio, it is often difficult to consistently achieve complete and thorough combustion within the main combustion chamber of the internal combustion engine, especially in large bore engines, due to the relatively slow rate of flame propagation from a single point ignition source such as a spark plug. Moreover, turbulence within the main combustion chamber may disadvantageously extinguish the ignition flame that is propagating through the cylinder prior to complete combustion of the lean gaseous fuel therein. When the ignition flame is extinguished in such a manner, the power output of the engine is disadvantageously reduced. In addition, the amount of raw, uncombusted fuel which is exhausted from the engine is disadvantageously increased.

To this end, a number of internal combustion engines have heretofore been designed which have a fuel combustion assembly which includes a precombustion chamber. A precombustion chamber is a relatively small gas accumulating chamber which is positioned in the engine head so as to be in fluid communication with the main combustion chamber of the engine via a number of small orifices. An enriched gaseous fuel is advanced into the precombustion chamber. A spark plug associated with the engine ignites the enriched gaseous fuel within the precombustion chamber (as opposed to igniting the lean gaseous fuel in the main combustion chamber). Ignition of the enriched gaseous fuel creates a front of burning fuel which is jetted or otherwise advanced through the orifices and into the main combustion chamber thereby igniting the lean gaseous fuel therein. The front of burning fuel jetting out of the orifices is generally a sufficient ignition source to cause complete combustion of the lean gaseous fuel within the main combustion chamber without being extinguished by the turbulence therein.

However, use of precombustion chambers which have heretofore been designed has a number of drawbacks associated therewith. For example, the internal combustion engine must be configured to include an enriched fuel source, along with a fuel delivery system, for advancing enriched gaseous fuel into the precombustion chamber. Such a configuration increases the number of components associated with the internal combustion engine thereby disadvantageously increasing costs associated with the engine. In addition, although use of lean gaseous fuels reduces the amount of $NO_x$ produced in the main combustion chamber, an undesirable amount of $NO_x$ is produced in the precombustion chamber due to the combustion of enriched gaseous fuels therein.

What is needed therefore is a fuel combustion assembly for an internal combustion engine which overcomes one or more of the above-mentioned drawbacks.

DISCLOSURE OF THE INVENTION

In accordance with a first embodiment of the present invention, there is provided a fuel combustion assembly for an internal combustion engine. The engine includes an engine block having a piston cylinder defined therein. The engine also includes an engine head secured to the engine block and a piston which translates within the piston cylinder. The piston, the piston cylinder, and the engine head cooperate so as to define a main combustion chamber. The fuel combustion assembly includes a precombustion member secured to the engine head. The precombustion member has a number of first ignition orifices defined therein. Moreover, the precombustion member further has a precombustion chamber defined therein. The precombustion member is positioned relative to the engine head such that the precombustion chamber is in fluid communication with the main combustion chamber via the number of first ignition orifices. The fuel combustion assembly also includes a spark plug for igniting a gaseous fuel. The spark plug includes an encapsulating member which has a number of second ignition orifices defined therein. The encapsulating member defines a plug combustion chamber. The spark plug further includes a center electrode and a ground electrode. Both the center electrode and the ground electrode are positioned within the plug combustion chamber. The encapsulating member is positioned relative to the precombustion member such that the plug combustion chamber is in fluid communication with the precombustion chamber via the number of second ignition orifices.

In accordance with a second embodiment of the present invention, there is provided a method of igniting gaseous fuel within a fuel combustion assembly of an internal combustion engine. The internal combustion engine includes an engine block having a piston cylinder defined therein, an engine head secured to the engine block, and a piston which translates within the piston cylinder. The piston, the piston cylinder, and the engine head cooperate so as to define a main combustion chamber. The fuel combustion assembly includes a precombustion member having a precombustion chamber defined therein and a spark plug having a plug combustion chamber defined therein. The method includes the step of generating a spark within the plug combustion chamber so as to ignite gaseous fuel therein such that a first quantity of burning fuel is advanced out of the plug combustion chamber and into the precombustion chamber. The method also includes the step of igniting gaseous fuel within the precombustion chamber with the first quantity of burning fuel such that a second quantity of burning fuel is advanced out of the precombustion chamber and into the main combustion chamber. Moreover, the method includes the step of igniting gaseous fuel within the main combustion chamber with the second quantity of burning fuel, whereby gaseous fuel within the main combustion chamber combusts so as to advance the piston within the piston cylinder.

In accordance with a third embodiment of the present invention, there is provided an internal combustion engine. The internal combustion engine includes an engine block having a piston cylinder defined therein. The internal combustion engine also includes an engine head secured to the engine block. The internal combustion engine further includes a piston which translates within the piston cylinder, wherein the piston, the piston cylinder, and the engine head cooperate so as to define a main combustion chamber. The internal combustion engine further includes a precombustion member secured to the engine head. The precombustion member has a number of first ignition orifices defined therein. The precombustion member further has a precombustion chamber defined therein. The precombustion member is positioned relative to the engine head such that the precombustion chamber is in fluid communication with the main combustion chamber via the number of first ignition orifices. The internal combustion engine further has a spark plug for igniting a gaseous fuel. The spark plug includes an encapsulating member which has a number of second ignition orifices defined therein. The encapsulating member defines a plug combustion chamber. The spark plug further includes a center electrode and a ground electrode. Both the center electrode and the ground electrode are positioned within the plug combustion chamber. The encapsulating member is positioned relative to the precombustion member such that the plug combustion chamber is in fluid communication with the precombustion chamber via the number of second ignition orifices.

BEST MODE FOR CARRYING OUT THE INVENTION

Figure 1:
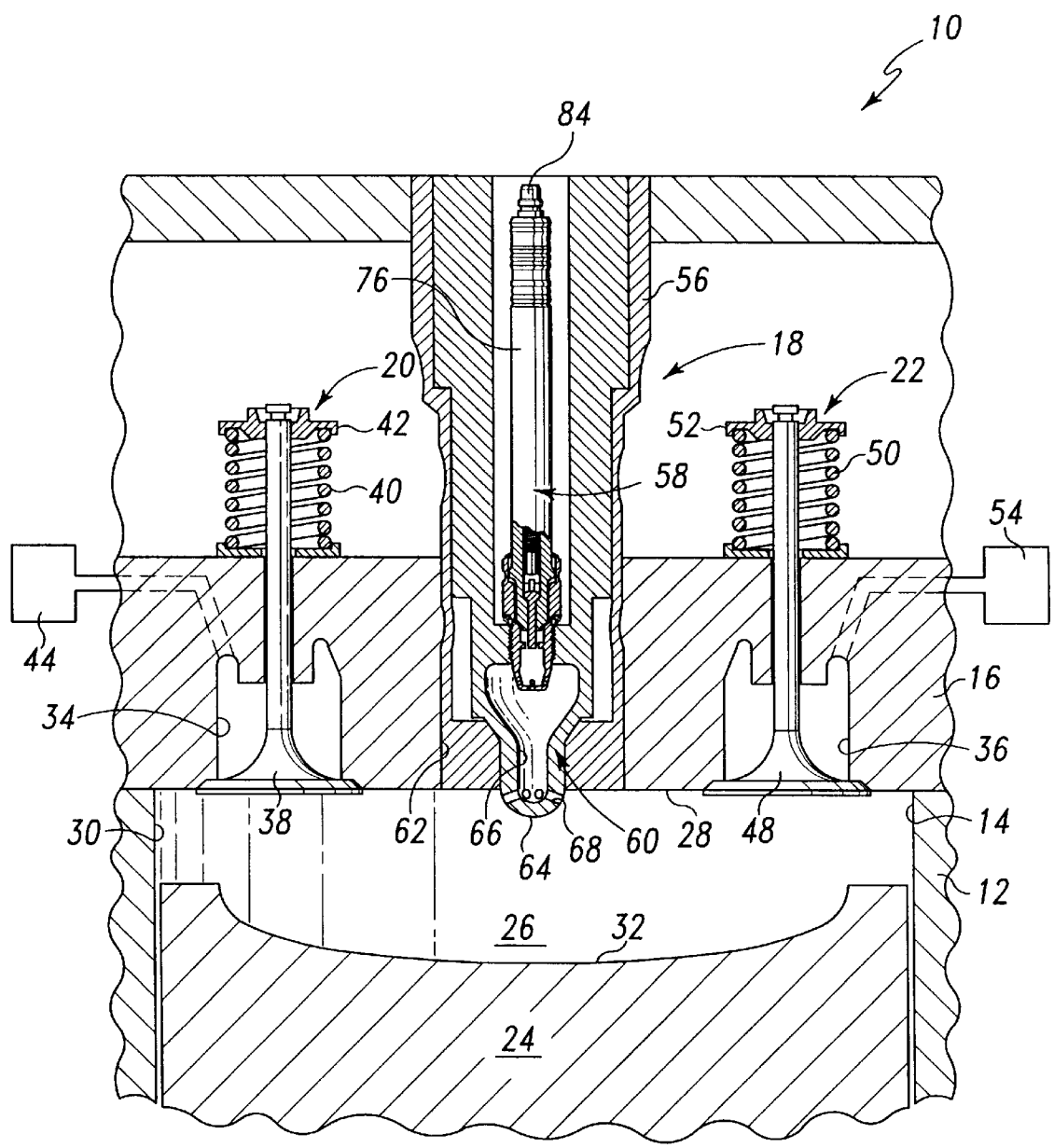
FIG. 1 is a fragmentary cross sectional view of a first embodiment of an internal combustion engine which incorporates the features of the present invention therein, note that a portion of the spark plug is not shown in cross section for clarity of description.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
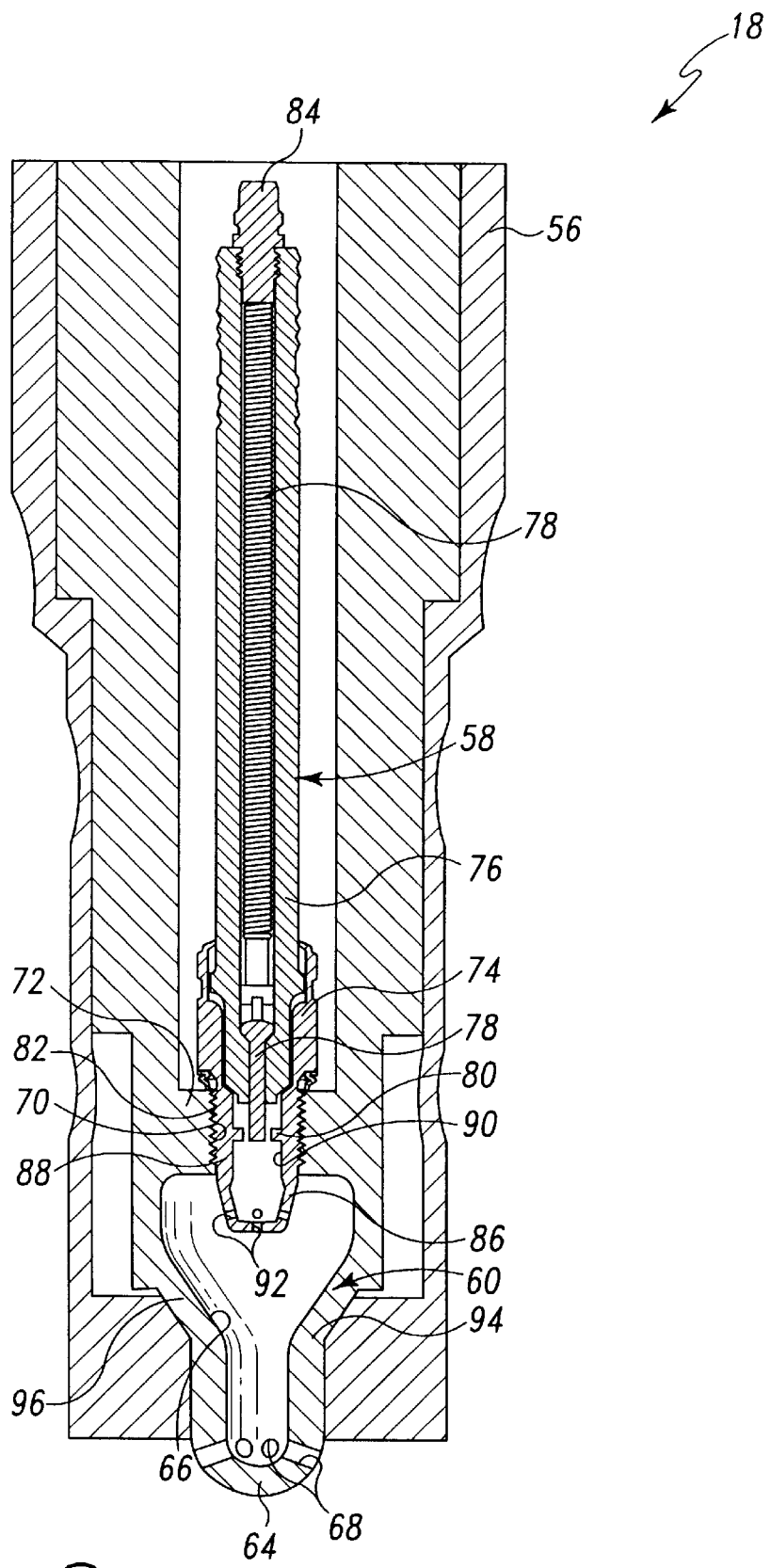
FIG. 2 is an enlarged cross sectional view of the fuel combustion assembly of the internal combustion engine of FIG. 1.

Referring now to FIGS. 1 and 2, there is shown an internal combustion engine 10. The internal combustion engine 10 is a lean-burn internal combustion engine which is fueled by a lean gaseous fuel mixture. What is meant herein by the term "lean gaseous fuel" is a mixture of a gaseous fuel (e.g. natural gas, low BTU fuel, or propane) and air which includes larger amounts of air relative to a stoichiometric fuel and air mixture.

The internal combustion engine 10 includes an engine block 12, an engine head 16, a fuel combustion assembly 18, and intake valve assembly 20, and an exhaust valve assembly 22. The engine block 12 has a piston cylinder 14 defined therein. A piston 24 translates within the piston cylinder 14 so as to drive a crankshaft (not shown) in a known manner.

The piston 24, the piston cylinder 14, and the engine head 16 cooperate so as to define a main combustion chamber 26. In particular, a bottom surface 28 of the engine head 16, an inner wall 30 of the piston cylinder 14, and a top surface 32 of the piston 24 cooperate to define the main combustion chamber 26, as shown in FIG. 1. It should be appreciated that when gaseous fuel is combusted in the main combustion chamber 26, a force is applied to the top surface 32 of the piston 24 such that the piston 24 is driven or otherwise urged downwardly (as viewed in FIG. 1) so as to rotate the crankshaft (not shown) of the internal combustion engine 10 thereby producing mechanical output.

The engine head 16 has an intake port 34 and an exhaust port 36 defined therein. The intake valve assembly 20 controls a flow of lean gaseous fuel through the intake port 34. In particular, the intake valve assembly 20 includes a valve member 38, a concentric valve spring 40, and a rocker arm 42. In a known manner, the valve spring 40 biases the valve member 38 upwardly (as viewed in FIG. 1) so as to keep the valve member 38 seated or otherwise located in a closed position, as shown in FIG. 1. A camshaft (not shown) associated with the internal combustion engine 10 selectively contacts the rocker arm 42 so as to cause the rocker arm 42 to move the valve member 38 downwardly (as viewed in FIG. 1) thereby unseating or otherwise positioning the valve member 38 in an open position.

It should be appreciated that when the valve member 38 is positioned in its open position, the intake port 34 is in fluid communication with the main combustion chamber 26, whereas when the valve member 38 is positioned in its closed position, the intake port 34 is isolated from the main combustion chamber 26. In particular, lean gaseous fuel is allowed to advance from the intake port 34 and into the main combustion chamber 26 when the valve member 38 is positioned in its open position, whereas lean gaseous fuel is prevented from being advanced from the intake port 34 into the main combustion chamber 26 when the valve member 38 is positioned in its closed position.

As shown in FIG. 1, the intake port 34 is in fluid communication with a lean gaseous fuel source such as an intake manifold 44. Hence, when the intake valve member 38 is positioned in its open position, lean gaseous fuel is advanced from the intake manifold 44, through the intake port 34, and into the main combustion chamber 26.

The exhaust valve assembly 22 controls the flow of exhaust gases through the exhaust port 36. In particular, the exhaust valve assembly 22 includes a valve member 48, a concentric valve spring 50, and a rocker arm 52. In a known manner, the valve spring 50 biases the valve member 48 upwardly (as viewed in FIG. 1) so as to keep the valve member 48 seated or otherwise located in a closed position, as shown in FIG. 1. The camshaft (not shown) associated with the internal combustion engine 10 selectively contacts the rocker arm 52 so as to cause the rocker arm 52 to move the valve member 48 downwardly (as viewed in FIG. 1) thereby unseating or otherwise positioning the valve member 48 in an open position.

It should be appreciated that when the valve member 48 is positioned in its open position, the exhaust port 36 is in fluid communication with the main combustion chamber 26, whereas when the valve member 48 is positioned in its closed position the exhaust port 36 is isolated from the main combustion chamber 26. In particular, exhaust gases are allowed to advance from the main combustion chamber 26 into the exhaust port 36 when the valve member 48 is positioned in its open position, whereas gaseous fuel is prevented from being advanced from the main combustion chamber 26 into the exhaust port 36 when the valve member 48 is positioned in its closed position.

As shown in FIG. 1, the exhaust port 36 is in fluid communication with an exhaust outlet such as an exhaust manifold 54 of the internal combustion engine 10. Hence, when the exhaust valve member 48 is positioned in its open position, exhaust gases are advanced from the main combustion chamber 26 to the exhaust manifold 54 via the exhaust port 36.

The fuel combustion assembly 18 is provided to ignite lean gaseous fuel within the main combustion chamber 26 thereby causing combustion of such lean gaseous fuel. The fuel combustion assembly 18 includes a housing 56, a spark plug 58, and a precombustion member 60. As shown in FIG. 1, the housing 56 of the precombustion assembly 18 is secured within an aperture 62 defined in the engine head 16 such that a bottom end portion 64 of the precombustion member 60 extends into the main combustion chamber 26.

The precombustion member 60 has a precombustion chamber 66 defined therein. Moreover, the precombustion member 60 has a number of orifices 68 defined therein. The precombustion chamber 66 is in fluid communication with the main combustion chamber 26 via the orifices 68. Hence, when lean gaseous fuel is advanced into the main combustion chamber 26 from the intake port 34 in the manner described above, lean gaseous fuel advances into the precombustion chamber 66 via the orifices 68.

As shown in FIG. 1, the precombustion chamber 66 possesses a volume which is substantially smaller than the volume of the main combustion chamber 26 when the piston 24 is positioned in a top dead center (TDC) of its stroke. In particular, the precombustion chamber 66 may possess a volume which is between 0.5% and 4.0% of the volume of the main combustion chamber 26.

The precombustion member 60 further has a threaded aperture 70 defined in a top end wall portion 72 thereof. The spark plug 58 is secured within the threaded aperture 70. In particular, the spark plug 58 includes a casing 74, an insulator 76, a center electrode 78, and a number of ground electrodes 80. An outer surface of the casing 74 includes a threaded portion 82 which is threadingly engaged with the threaded aperture 70 defined in the precombustion member 60.

The casing 74 supports and seals against the insulator 76 of the spark plug 58. Moreover, the insulator 76 surrounds and supports a portion of the center electrode 78, and is provided to prevent arcing or "spark-over" from a top portion 84 of the center electrode 78 to the casing 74.

The spark plug 58 is of a type of spark plug commonly referred to as an "encapsulated spark plug". In particular, a lower portion 86 of the casing 74 defines an encapsulating member 88. The encapsulating member 88 has a plug combustion chamber 90 defined therein. As shown in FIG. 2, both the center electrode 78 and the ground electrodes 80 are positioned within the plug combustion chamber 90. As shall be discussed below in greater detail, the encapsulating member 88 shelters or otherwise prevents the spark generated by the spark plug 58 from being extinguished by the turbulence associated with combustion in the precombustion chamber 66 and the main combustion chamber 26.

Moreover, the encapsulating member 88 has a number of orifices 92 defined therein. The plug combustion chamber 90 is in fluid communication with the precombustion chamber 66 via the orifices 92. Hence, when lean gaseous fuel is advanced into the main combustion chamber 26 from the intake port 34 in the manner described above, lean gaseous fuel advances into the precombustion chamber 66 via the orifices 68, and thereafter into the plug combustion chamber 90 via the orifices 92. Hence, as described, the precombustion chamber 66 is a "non-enriched" precombustion chamber. More specifically, the lean gaseous fuel within the precombustion chamber 66 is not enriched, but rather has the same air-to-fuel ratio as the lean gaseous fuel within the main combustion chamber 26.

As shown in FIG. 1, the plug combustion chamber 90 possesses a volume which is substantially smaller than the volume of the precombustion chamber 66. In particular, the plug combustion chamber 90 possesses a volume which is between 0.1% and 2.0% of the volume of the precombustion chamber 66.

In addition, it should be appreciated that the size of the orifices, 68 defined in the precombustion member 60 is substantially greater than the size of the orifices 92 defined in the encapsulating member 88. In particular, the orifices 68 defined in the precombustion member 60 preferably have a diameter of approximately 4.5 millimeters, whereas the orifices 92 defined in the encapsulating member 88 preferably have a diameter of approximately 1.2 millimeters. It should further be appreciated that the orifices 68, 92 may be embodied as having a uniform diameter throughout the length thereof, or may alternatively be embodied to have a tapered diameter which either increases or decreases from one end of the orifices 68, 92 to the other. Moreover, it should also be appreciated that the encapsulating member 88 may also be configured to include only a single orifice 92. In such a configuration, the single orifice 92 would preferably possess the same area as the total area of the plurality of orifices 92 shown in FIGS. 1–4.

Although the spark plug 58 is herein shown in the figures and described as being a multi-jet encapsulated spark plug, other spark plug configurations may be used as the spark plug 58 of the present invention. For example, a multi-torch encapsulated spark plug may be used as the spark plug 58 of the present invention. Examples of spark plugs which are suitable for use as the spark plug 58 of the present invention are disclosed in U.S. Pat. Nos. 4,987,868 and 5,105,780, both of which are issued to Richardson and assigned to the same assignee as the present invention.

It should be appreciated that the configuration of the fuel combustion assembly 18 enables enhanced ignition capabilities of lean gaseous fuel relative to fuel combustion assemblies which have heretofore been designed. In particular, once lean gaseous fuel is advanced into each of the main combustion chamber 26, the precombustion chamber 66, and the plug combustion chamber 90 in the manner is previously described, an engine control module (not shown) or the like which is electrically coupled to the spark plug 58 selectively generates an output signal which causes the spark plug 58 to create a spark between the center electrode 78 and the ground electrodes 80. Such a spark ignites the lean gaseous fuel within the plug combustion chamber 90. Ignition of the lean gaseous fuel within the plug combustion chamber 90 causes a first front of burning fuel to be jetted or otherwise advanced through the orifices 92 and into the precombustion chamber 66. The front of burning fuel entering the precombustion chamber 66 ignites the lean gaseous fuel within the precombustion chamber 66. Ignition of the lean gaseous fuel within the precombustion chamber 66 causes a second, larger front of burning fuel to be jetted or otherwise advanced through the orifices 68 and into the main combustion chamber 26. The front of burning fuel entering the main combustion chamber 26 ignites the lean gaseous fuel within the main combustion chamber 26 thereby driving or otherwise urging the piston 24 downwardly (as viewed in FIG. 1) so as to rotate the crankshaft (not shown) of the internal combustion engine 10 thereby producing mechanical output.

Figure 3:
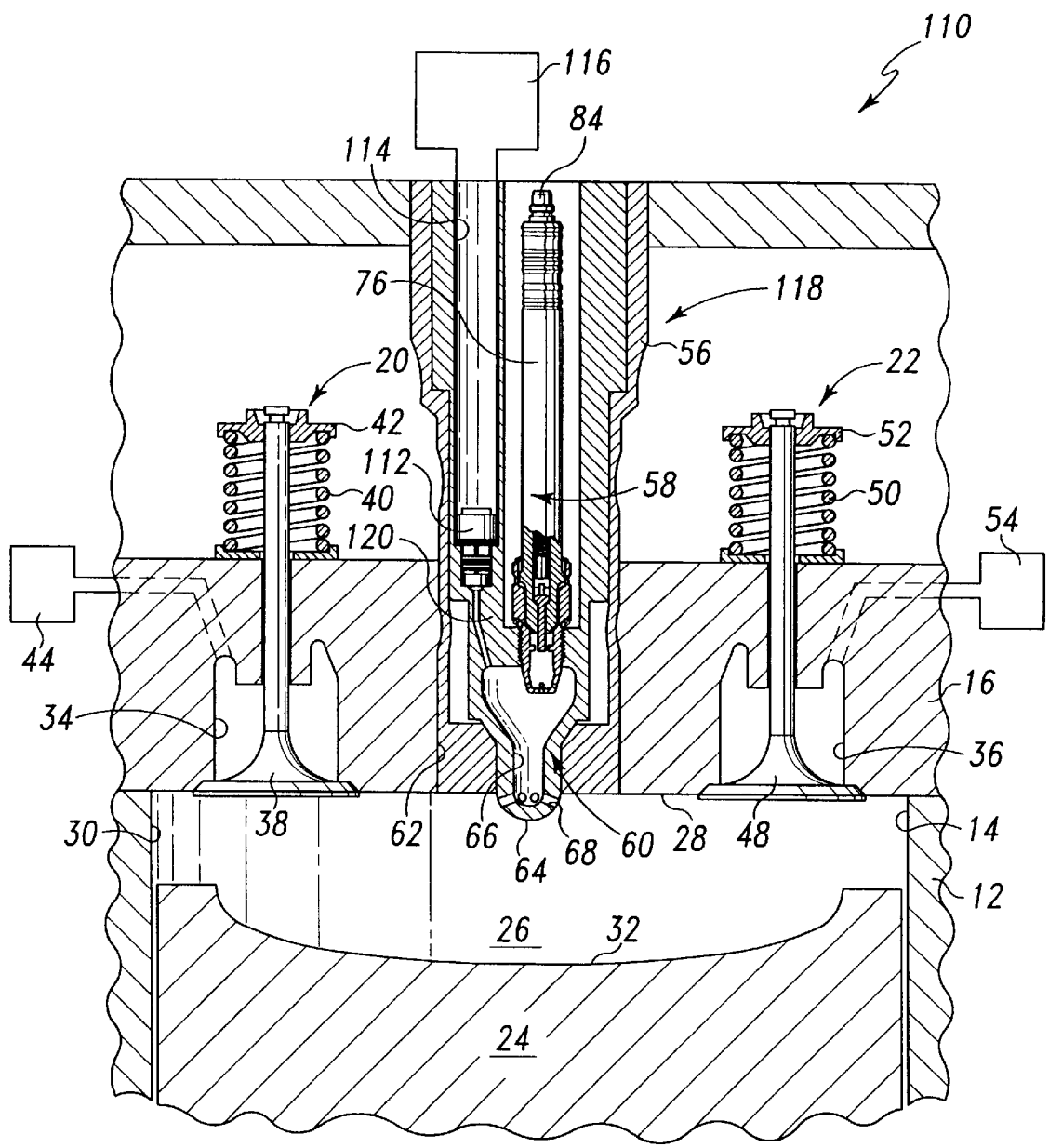
FIG. 3 is a view similar to FIG. 1, but showing a second embodiment of an internal combustion engine which incorporates the features of the present invention therein.
Figure 4:
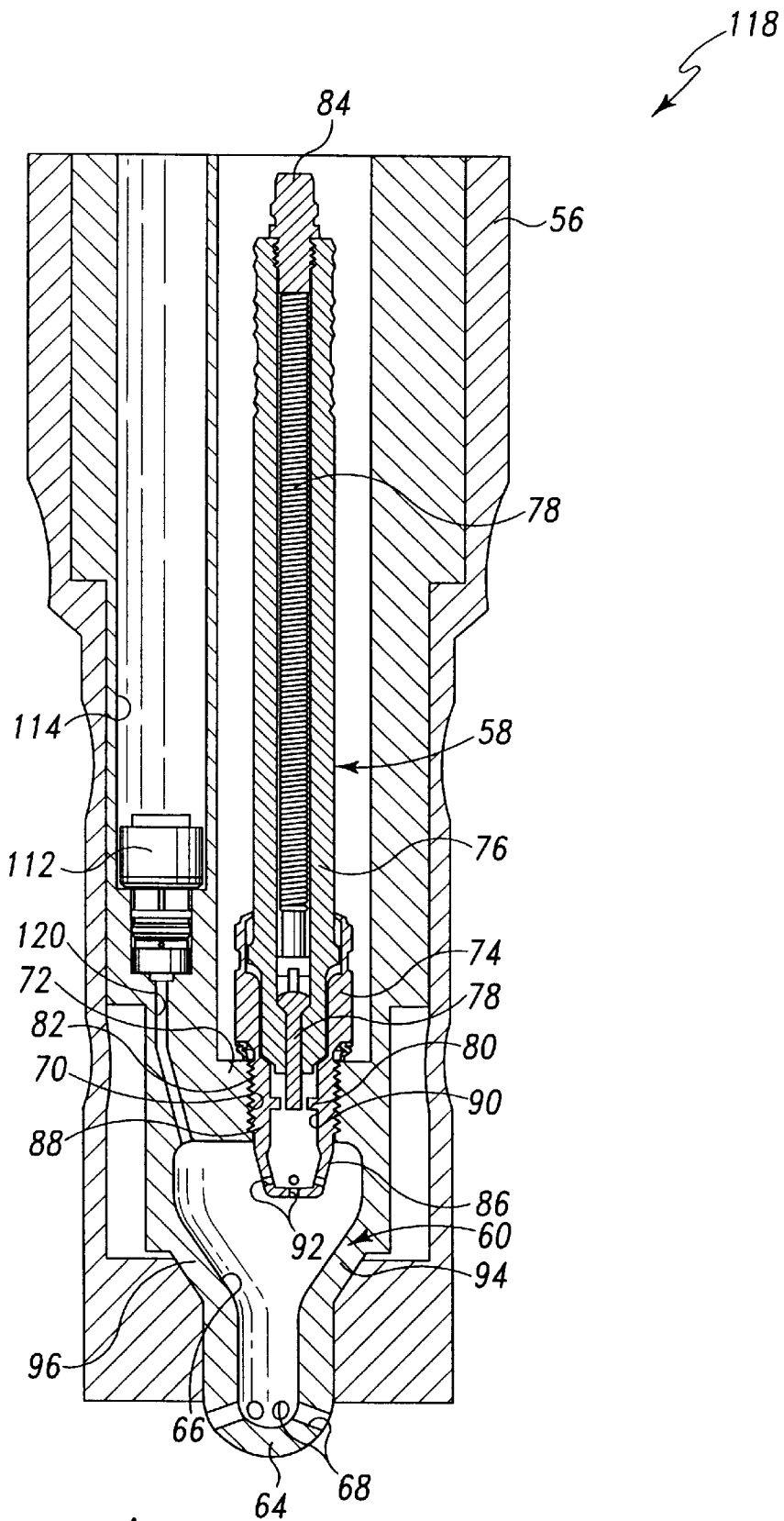
FIG. 4 is an enlarged cross sectional view of the fuel combustion assembly of the internal combustion engine of FIG. 3.

Referring now to FIGS. 3–4, there is shown an internal combustion engine 110 which is a second embodiment of the present invention. The internal combustion engine 110 is somewhat similar to internal combustion engine 10. Thus, the same reference numerals are used in FIGS. 3–4 to designate common components which were previously discussed in regard to FIGS. 1–2.

In lieu of the fuel combustion assembly 18, the internal combustion engine 110 includes a fuel combustion assembly 118. The fuel combustion assembly 118 is somewhat similar to the fuel combustion assembly 18, except that the precombustion chamber 66 of the fuel combustion assembly 118 is an "enriched precombustion chamber". More specifically, the fuel combustion assembly 118 includes an auxiliary fuel valve 112 positioned such that an inlet thereof is in fluid communication with an enriched fuel source 116 via a fuel port 114 defined in the housing 56. Hence, the auxiliary fuel valve 112 controls a flow of enriched gaseous fuel from the enriched fuel source 116. What is meant herein by the term "enriched gaseous fuel" is a mixture of a gaseous fuel (e.g. natural gas, low BTU fuel, or propane) and air which includes larger amounts of fuel relative to the lean gaseous fuel mixture advanced into the main combustion chamber 26.

An outlet of the auxiliary fuel valve 112 is in fluid communication with the precombustion chamber 66. In particular, the outlet of the auxiliary fuel valve 112 is coupled to the precombustion chamber 66 via a fuel line 120 defined in the housing 56. Hence, when the auxiliary fuel valve 112 is positioned in an open position, enriched gaseous fuel is allowed to advance from the enriched fuel source 116, through the fuel port 114, the fuel line 120, and into the precombustion chamber 66 and hence the plug combustion chamber 90 (via the orifices 92). Conversely, when the auxiliary fuel valve 112 is positioned in a closed position, the precombustion chamber 66 is isolated from the enriched fuel source 116 thereby preventing enriched gaseous fuel from being advanced from the enriched fuel source 116 into the precombustion chamber 66 or the plug combustion chamber 90.

It should be appreciated that similarly to the configuration of the fuel combustion assembly 18, the configuration of the fuel combustion assembly 118 enables enhanced ignition capabilities of lean gaseous fuel relative to fuel combustion assemblies which have heretofore been designed. In particular, lean gaseous fuel is advanced into the main combustion chamber 26 via the intake port 34 in the manner previously described. The engine control module (not shown) which is electrically coupled to both the auxiliary fuel valve 112 and the spark plug 58 selectively generates an output signal which causes the auxiliary fuel valve 112 to be positioned in its open position thereby allowing enriched gaseous fuel to be advanced from the enriched fuel source 116 into the precombustion chamber 66 and thereafter plug combustion chamber 90 (via the orifices 92). It should be appreciated that other configurations of the auxiliary fuel valve 112 are also contemplated for use in the present invention. For example, the auxiliary fuel valve 112 may be configured as a check valve which allows enriched gaseous fuel to flow therethrough and into the precombustion chamber 66 when the pressure in the main combustion chamber 26 is less than the pressure in the fuel port 114 (e.g. during the intake stroke of the internal combustion engine 10).

Once enriched gaseous fuel is advanced into the precombustion chamber 66, the engine control module selectively generates an output signal which causes the spark plug 58 to create a spark between the center electrode 78 and the ground electrodes 80. Such a spark ignites the enriched gaseous fuel within the plug combustion chamber 90. Ignition of the enriched gaseous fuel within the plug combustion chamber 90 causes a first front of burning fuel to be jetted or otherwise advanced through the orifices 92 and into the precombustion chamber 66. The front of burning fuel entering the precombustion chamber 66 ignites the enriched gaseous fuel within the precombustion chamber 66. Ignition of the enriched gaseous fuel within the precombustion chamber 66 causes a second, larger front of burning fuel to be jetted or otherwise advanced through the orifices 68 and into the main combustion chamber 26. The front of burning fuel entering the main combustion chamber 26 ignites the lean gaseous fuel within the main combustion chamber 26 thereby driving or otherwise urging the piston 24 downwardly (as viewed in FIG. 3) so as to rotate the crankshaft (not shown) of the internal combustion engine 10 thereby producing mechanical output.

It should further be appreciated that although the precombustion chamber 66 of the fuel combustion assembly 118 is an enriched precombustion chamber, a leaner mixture of enriched gaseous fuel may be ignited therein relative to enriched precombustion chambers which have heretofore been designed. In particular, the front of burning fuel which is jetted out of the orifices 92 of the spark plug 58 provides a relatively large ignition source within the precombustion chamber 66 thereby facilitating use of leaner gaseous fuels within the precombustion chamber 66. In particular, fuel combustion assemblies which have heretofore been designed utilize only the spark created by a non-encapsulated spark plug as an ignition source within the precombustion chamber thereby necessitating use of enriched gaseous fuels which contain larger amounts of fuel (i.e. a smaller air-to-fuel ratio) relative to the amount of fuel which is required in the enriched gaseous fuel used in the enriched precombustion chamber 66 of the fuel combustion assembly 118.

Industrial Applicability

In operation, the fuel combustion assemblies 18, 118 of the internal combustion engines 10, 110, respectively, may be used to ignite a lean gaseous fuel within the main combustion chamber 26. In particular to operation of the internal combustion engine 10, the camshaft (not shown) associated with the internal combustion engine 10 selectively contacts the rocker arm 42 of the intake valve assembly 20 so as to cause the rocker arm 42 to move the valve member 38 downwardly (as viewed in FIG. 1) thereby unseating or otherwise positioning the valve member 38 in its open position. Lean gaseous fuel is then allowed to advance from the intake manifold 44, through the intake port 34, and into the main combustion chamber 26. The lean gaseous fuel then advances from the main combustion chamber 26 into the precombustion chamber 66 via the orifices 68, and thereafter into the plug combustion chamber 90 via the orifices 92.

Once lean gaseous fuel is advanced into each of the main combustion chamber 26, the precombustion chamber 66, and the plug combustion chamber 90, the engine control module (not shown) selectively generates an output signal which causes the spark plug 58 to create a spark between the center electrode 78 and the ground electrodes 80. Such a spark ignites the lean gaseous fuel within the plug combustion chamber 90. Ignition of the lean gaseous fuel within the plug combustion chamber 90 causes a first front of burning fuel to be jetted or otherwise advanced through the orifices 92 and into the precombustion chamber 66. The front of burning fuel entering the precombustion chamber 66 ignites the lean gaseous fuel within the precombustion chamber 66. Ignition of the lean gaseous fuel within the precombustion chamber 66 causes a second, larger front of burning fuel to be jetted or otherwise advanced through the orifices 68 and into the main combustion chamber 26. The front of burning fuel entering the main combustion chamber 26 ignites the lean gaseous fuel within the main combustion chamber 26 thereby driving or otherwise urging the piston 24 downwardly (as viewed in FIG. 1) so as to rotate the crankshaft (not shown) of the internal combustion engine 10 thereby producing mechanical output.

In particular to operation of the internal combustion engine 110, the camshaft (not shown) associated with the internal combustion engine 10 selectively contacts the rocker arm 42 of the intake valve assembly 20 so as to cause the rocker arm 42 to move the valve member 38 downwardly (as viewed in FIG. 3) thereby unseating or otherwise positioning the valve member 38 in its open position. Lean gaseous fuel is then allowed to advance from the intake manifold 44, through the intake port 34, and into the main combustion chamber 26. The engine control module generates an output signal which causes the auxiliary fuel valve 112 to be positioned in its open position thereby allowing enriched gaseous fuel to be advanced from the enriched fuel source 116 into the precombustion chamber 66 and thereafter the plug combustion chamber 90 (via the orifices 92).

The engine control module then selectively generates an output signal which causes the spark plug 58 to create a spark between the center electrode 78 and the ground electrodes 80. Such a spark ignites the enriched gaseous fuel within the plug combustion chamber 90. Ignition of the enriched gaseous fuel within the plug combustion chamber 90 causes a first front of burning fuel to be jetted or otherwise advanced through the orifices 92 and into the precombustion chamber 66. The front of burning fuel entering the precombustion chamber 66 ignites the enriched gaseous fuel within the precombustion chamber 66. Ignition of the enriched gaseous fuel within the precombustion chamber 66 causes a second, larger front of burning fuel to be jetted or otherwise advanced through the orifices 68 and into the main combustion chamber 26. The front of burning fuel entering the main combustion chamber 26 ignites the lean gaseous fuel within the main combustion chamber 26 thereby driving or otherwise urging the piston 24 downwardly (as viewed in FIG. 3) so as to rotate the crankshaft (not shown) of the internal combustion engine 110 thereby producing mechanical output.

From the above discussion, it should be appreciated that the fuel combustion assemblies 18, 118 have a number of advantages over fuel combustion assemblies which have heretofore been designed. For example, in the case of the fuel combustion assembly 18, use of a non-enriched precombustion chamber 66 reduces the number of components associated with the fuel combustion assembly 18 relative to fuel combustion assemblies which have heretofore been designed thereby reducing costs associated with the internal combustion engine 10. In addition, in the case of both the fuel combustion assembly 18 and the fuel combustion assembly 118, a leaner gaseous fuel is combusted in the precombustion chamber 66 (and hence the plug combustion chamber 90) relative to the enriched gaseous fuel which is combusted in precombustion chambers of fuel combustion assemblies which have heretofore been designed. Use of leaner gaseous fuels reduces the amount of $NO_x$, which is produced during combustion within the precombustion chamber 66. Moreover, use of leaner gaseous fuels reduces peak combustion temperatures within the plug combustion chamber 90 thereby increasing the useful life of the spark plug 58.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, it should be appreciated that numerous materials and various configurations (i.e. shapes and sizes) may be used in construction of the precombustion member 60 of the present invention. Moreover, although the threaded aperture 70 is herein described as being defined in the top end 72 of the precombustion member 60, other configurations of the precombustion member 60 may also be used with the present invention. For example, a threaded aperture similar to the threaded aperture 70 may be defined in either a sidewall portion 94 or a sidewall portion 96 of the precombustion member 60, as shown in FIGS. 2 and 4. It should be appreciated that in such a configuration, the spark plug 58 would be secured to either the sidewall portion 94 or the sidewall portion 96, respectively, in a manner similar to the manner described above in regard to securing the spark plug 58 to the top wall portion 72 of the precombustion member 60.

What is claimed is:

1. An internal combustion engine, comprising:

an engine block having a piston cylinder defined therein;

an engine head secured to said engine block;

a piston which translates within said piston cylinder, wherein said piston, said piston cylinder, and said engine head cooperate so as to define a main combustion chamber;

a precombustion member secured to said engine head, wherein (i) said precombustion member has a number of first ignition orifices defined therein, (ii) said precombustion member further has a precombustion chamber defined therein, and (iii) said precombustion member is positioned relative to said engine head such that said precombustion chamber is in fluid communication with said main combustion chamber via said number of first ignition orifices; and a spark plug for igniting a gaseous fuel, wherein (i) said spark plug includes an encapsulating member which has a number of second ignition orifices defined therein, said encapsulating member defines a plug combustion chamber, (ii) said spark plug further includes a center electrode and a ground electrode, both said center electrode and said ground electrode are positioned within said plug combustion chamber, and (iii) said encapsulating member is positioned relative to said precombustion member such that said plug combustion chamber is in fluid communication with said precombustion chamber via said number of second ignition orifices.

2. The internal combustion engine of claim 1, wherein:

said engine head has a head aperture defined therein, said precombustion member is positioned within said head aperture, said precombustion member has a precombustion aperture defined therein, and said encapsulating member of said spark plug is positioned within said precombustion aperture.

3. The internal combustion engine of claim 1, further comprising an intake valve, wherein:

said engine head has an intake port defined therein, said intake valve is positioned within said intake port, said intake valve is positionable between an open intake valve position and a closed intake valve position, said intake port is in fluid communication with said main combustion chamber when said intake valve is positioned in said open intake valve position so as to allow said gaseous fuel to be advanced from said intake port into each of said main combustion chamber, said precombustion chamber, and said plug combustion chamber, and said intake port is isolated from fluid communication with said main combustion chamber when said intake valve is positioned in said closed intake valve position so as to prevent said gaseous fuel from being advanced from said intake port into each of said main combustion chamber, said precombustion chamber, and said plug combustion chamber.

4. The internal combustion engine of claim 1, further comprising an auxiliary fuel valve, wherein:

said auxiliary fuel valve is positionable between an open auxiliary valve position and a closed auxiliary valve position, said precombustion chamber is in fluid communication with an enriched fuel source when said auxiliary valve is positioned in said open auxiliary valve position so as to allow enriched fuel to be advanced from said enriched fuel source into each of said precombustion chamber and said plug combustion chamber, and said precombustion chamber is isolated from fluid communication with said enriched fuel source when said auxiliary valve is positioned in said closed auxiliary valve position so as to prevent enriched fuel from being advanced from said enriched fuel source into each of said precombustion chamber and said plug combustion chamber.

5. The internal combustion engine of claim 1, wherein said gaseous fuel is a lean mixture of a natural gas and air.

6. A fuel combustion assembly for an internal combustion engine including (i) an engine block having a piston cylinder defined therein, (ii) an engine head secured to said engine block, and (iii) a piston which translates within said piston cylinder, wherein said piston, said piston cylinder, and said engine head cooperate so as to define a main combustion chamber, comprising:

a precombustion member secured to said engine head, wherein (i) said precombustion member has a number of first ignition orifices defined therein, (ii) said precombustion member further has a precombustion chamber defined therein, and (iii) said precombustion member is positioned relative to said engine head such that said precombustion chamber is in fluid communication with said main combustion chamber via said number of first ignition orifices; and a spark plug for igniting a gaseous fuel, wherein (i) said spark plug includes an encapsulating member which has a number of second ignition orifices defined therein, said encapsulating member defines a plug combustion chamber, (ii) said spark plug further includes a center electrode and a ground electrode, both said center electrode and said ground electrode are positioned within said plug combustion chamber, and (iii) said encapsulating member is positioned relative to said precombustion member such that said plug combustion chamber is in fluid communication with said precombustion chamber via said number of second ignition orifices.

7. The assembly of claim 1, wherein:

said engine head has a head aperture defined therein, said precombustion member is positioned within said head aperture, said precombustion member has a precombustion aperture defined therein, and said encapsulating member of said spark plug is positioned within said precombustion aperture.

8. The assembly of claim 1, wherein:

said engine head has an intake port defined therein, said internal combustion engine further includes an intake valve positioned within said intake port, said intake valve is positionable between an open intake valve position and a closed intake valve position, said intake port is in fluid communication with said main combustion chamber when said intake valve is positioned in said open intake valve position so as to allow said gaseous fuel to be advanced from said intake port into each of said main combustion chamber, said precombustion chamber, and said plug combustion chamber, and said intake port is isolated from fluid communication with said main combustion chamber when said intake valve is positioned in said closed intake valve position so as to prevent said gaseous fuel from being advanced from said intake port into each of said main combustion chamber, said precombustion chamber, and said plug combustion chamber.

9. The assembly of claim 8, further comprising an auxiliary fuel valve:

said auxiliary fuel valve is positionable between an open auxiliary valve position and a closed auxiliary valve position, said precombustion chamber is in fluid communication with an enriched fuel source when said auxiliary valve is positioned in said open auxiliary valve position so as to allow enriched fuel to be advanced from said enriched fuel source into each of said precombustion chamber and said plug combustion chamber, and said precombustion chamber is isolated from fluid communication with said enriched fuel source when said auxiliary valve is positioned in said closed auxiliary valve position so as to prevent enriched fuel from being advanced from said enriched fuel source into each of said precombustion chamber and said plug combustion chamber.

10. The assembly of claim 8, wherein when said piston is positioned at a top dead center position within said piston cylinder:

said main combustion chamber possesses a first volume, said precombustion chamber possesses a second volume, said plug combustion chamber possesses a third volume, said second volume is X % of said first volume, where 0.5<X<4.0, and said third volume is Y% of said second volume, where 0.1<Y<2.0.

11. The assembly of claim 8, wherein:

said number of first ignition orifices each possesses a first substantially uniform size, said number of second ignition orifices each possesses a second substantially uniform size, and said first substantially uniform size is greater than said second substantially uniform size.

12. The assembly of claim 8, wherein said gaseous fuel is a lean mixture of a natural gas and air.

13. A method of igniting gaseous fuel within a fuel combustion assembly of an internal combustion engine, wherein the internal combustion engine includes (i) an engine block having a piston cylinder defined therein, (ii) an engine head secured to the engine block, and (iii) a piston which translates within the piston cylinder, wherein the piston, the piston cylinder, and the engine head cooperate so as to define a main combustion chamber, and further wherein the fuel combustion assembly includes (i) a precombustion member having a precombustion chamber defined therein, and (ii) a spark plug having a plug combustion chamber defined therein, comprising the steps of:

generating a spark within the plug combustion chamber so as to ignite gaseous fuel therein such that a first quantity of burning fuel is advanced out of the plug combustion chamber and into the precombustion chamber;

igniting gaseous fuel within the precombustion chamber with the first quantity of burning fuel such that a second quantity of burning fuel is advanced out of the precombustion chamber and into the main combustion chamber; and igniting gaseous fuel within the main combustion chamber with the second quantity of burning fuel, whereby gaseous fuel within the main combustion chamber combusts so as to advance the piston within the piston cylinder.

14. The method of claim 8, wherein:

the precombustion member has a number of first ignition orifices defined therein, the precombustion member is positioned relative to the engine head such that the precombustion chamber is in fluid communication with the main combustion chamber via the number of first ignition orifices, the spark plug includes an encapsulating member which has a number of second ignition orifices defined therein, the encapsulating member defines the plug combustion chamber, the encapsulating member is positioned relative to the precombustion member such that the plug combustion chamber is in fluid communication with the precombustion chamber via the number of second ignition orifices, the first quantity of burning fuel is advanced out of the plug combustion chamber and into the precombustion chamber via the number of second ignition orifices, and the second quantity of burning fuel is advanced out of the precombustion chamber and into the main combustion chamber via the number of first ignition orifices.

15. The method of claim 8, wherein:

the engine head has a head aperture defined therein, the precombustion member is positioned within the head aperture, the precombustion member has a precombustion aperture defined therein, and the encapsulating member of the spark plug is positioned within the precombustion aperture.

16. The method of claim 13, wherein (i) the engine head has an intake port defined therein, and (ii) the internal combustion engine further includes an intake valve positioned within the intake port, further comprising the step of:

positioning the intake valve in an open intake valve position so as to allow the gaseous fuel to be advanced from the intake port into each of the main combustion chamber, the precombustion chamber, and the plug combustion chamber, wherein the intake valve positioning step occurs before the generating step.

17. The method of claim 16, wherein the fuel combustion assembly further includes an auxiliary fuel valve, further comprising the step of:

positioning the auxiliary valve in an open auxiliary valve position so as to allow enriched fuel to be advanced from an enriched fuel source into each of the precombustion chamber and the plug combustion chamber, wherein the auxiliary valve positioning step occurs before the generating step.

18. The method of claim 16, wherein when the piston is positioned at a top dead center position within the piston cylinder:

the main combustion chamber possesses a first volume, the precombustion chamber possesses a second volume, the plug combustion chamber possesses a third volume, the second volume is X % of the first volume, where 0.5<X<4.0, and the third volume is Y% of the second volume, where 0.1<Y<2.0.

19. The method of claim 16, wherein:

the number of first ignition orifices each possesses a first substantially uniform size, the number of second ignition orifices each possesses a second substantially uniform size, and the first substantially uniform size is greater than the second substantially uniform size.

20. The method of claim 16, wherein the gaseous fuel is a lean mixture of a natural gas and air.

* * * * *